United States Patent Office 3,450,603
Patented June 17, 1969

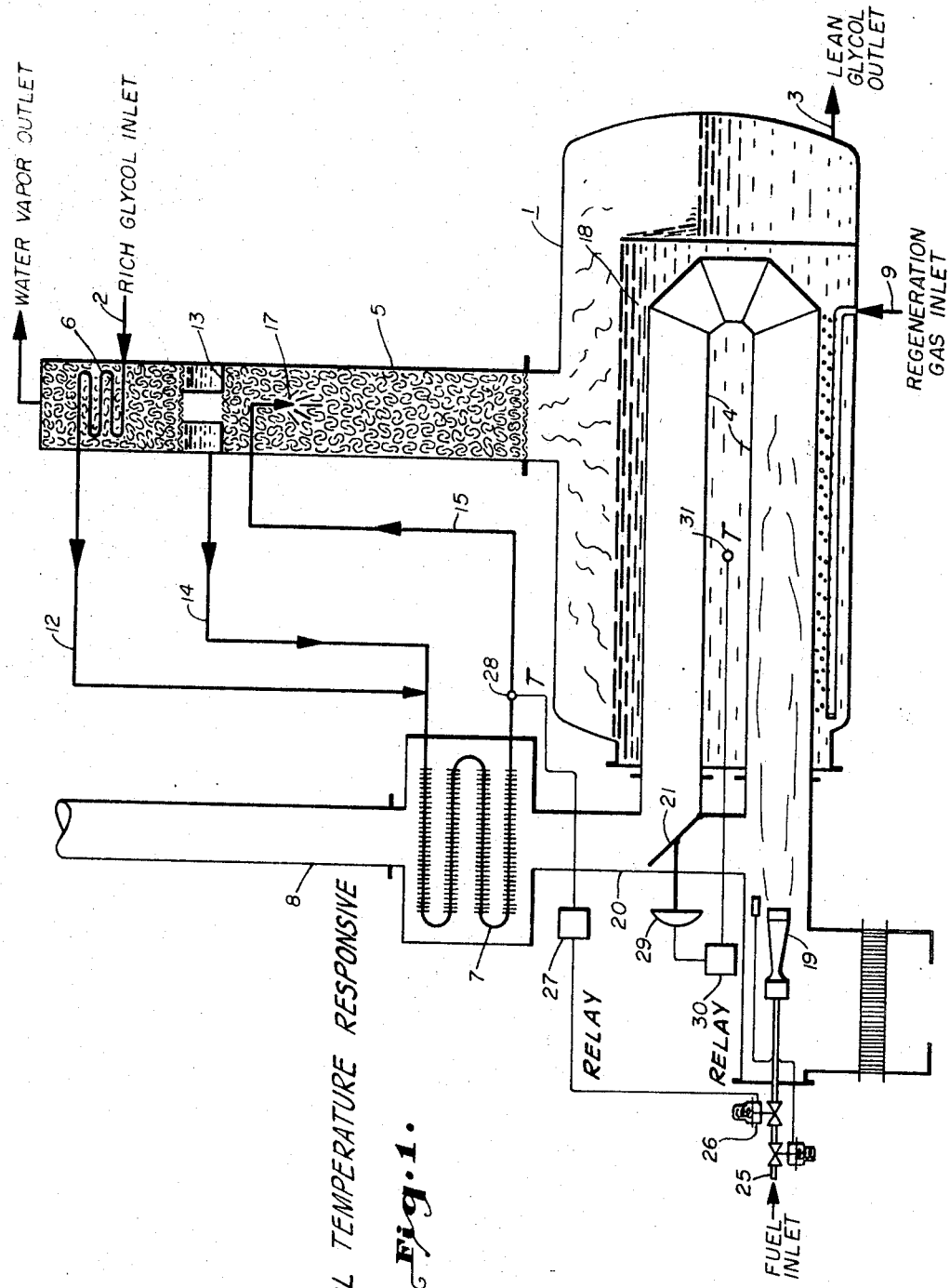

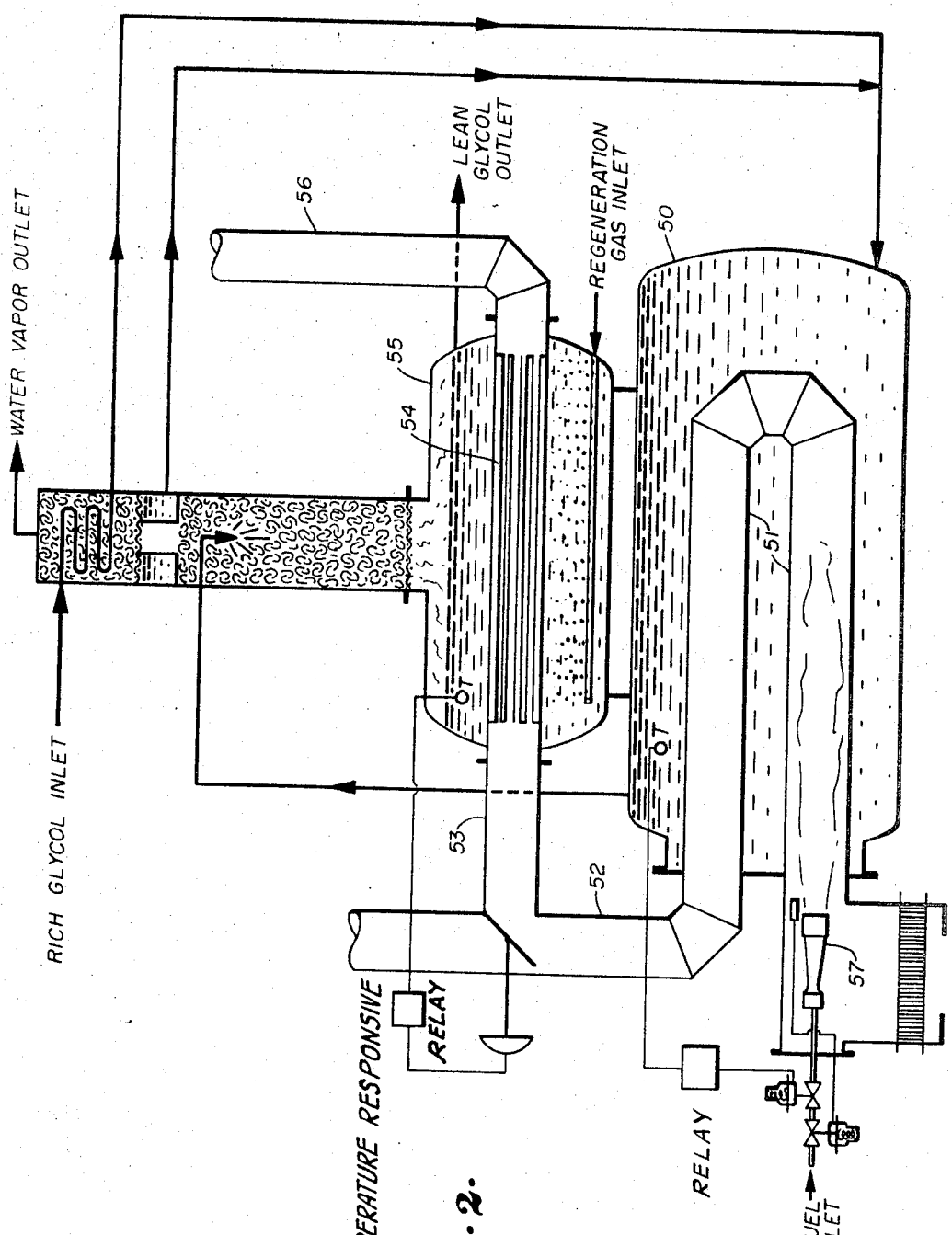

3,450,603
METHOD OF AND MEANS FOR RECONCENTRATING LIQUID DESICCANT
Charles O. Meyers and Robert W. Coggins, Tulsa, Okla., assignors to Combustion Engineering, Inc., New York, N.Y., a corporation of Delaware
Filed Mar. 10, 1967, Ser. No. 622,302
Int. Cl. C07c 29/26; B01d 3/14
U.S. Cl. 203—18                                                                 10 Claims

ABSTRACT OF THE DISCLOSURE

A heated vessel receives desiccant from which water is boiled to reconcentrate the desiccant for use in drying gas. A still column is mounted on the vessel to receive water and desiccant vapors and form a reflux to condense the glycol vapors back to the vessel while discharging water vapor to the atmosphere. The feed of liquid desiccant and water to the vessel still column is preheated to a predetermined level.

BACKGROUND OF THE INVENTION

Field of the invention

This invention relates to the thermal reconcentration of desiccant. More specifically, the invention relates to reconcentrating rich desiccant by both heat and a gas which is undersaturated with respect to water vapor.

Description of the prior art

Glycol is representative of liquid desiccants utilized to remove water from natural gas streams. After glycol absorbs water from gas, the mixture is heated to boil off the water. Glycol has a higher boiling point than the water, but the two are close enough that some glycol is vaporized along with the water.

Both vapors evolved by heat are passed up a still column which is usually packed with some form of granular material to provide an extended surface contact between liquid and gas. The glycol vapors are refluxed down the column with a cooling device in the upper portion of the still column. The water vapor passes to the atmosphere from the column. It is also common to introduce gas into the lower heated portion of the heated vessel, the gas being undersaturated with respect to water vapor. This gas shifts the vapor equilibrium above the heated glycol and additional water vaporizes and is ejected up the still column.

SUMMARY OF THE INVENTION

A principal object of the invention is to selectively apply heat to the rich glycol before and after this mixture is introduced into the still column.

Another object is to introduce gas, undersaturated with respect to water vapor, into the heated vessel at the same time heat is applied to the rich glycol.

The invention contemplates a heated vessel with a still column and a source of rich desiccant heated by an original source of heat prior to release within the still column for the combination of thermal reconcentration and shift of the vapor equilibrium by relatively dry gas introduced into the heated vessel.

The invention further contemplates a heated vessel with a still column and a source of rich desiccant heated by an original heat source mounted in the vessel prior to release within the still column for the combination of thermal reconcentration and shift of the vapor equilibrium by relatively dry gas introduced into the heated vessel.

BRIEF DESCRIPTION OF THE DRAWINGS

FIG. 1 is a somewhat diagrammatic illustration of a liquid desiccant reconcentrator in which the present invention is embodied.

FIG. 2 is another arrangement of heat source, preheater and reboiler of a liquid desiccant reconcentrator.

DESCRIPTION OF THE PREFERRED EMBODIMENT

General operation of the process

In FIG. 1, vessel 1 represents internally heated equipment for thermally processing material. More specifically, the vessel is a so-called reboiler for rich liquid desiccant. Glycol, as a desiccant, is introduced to the system through conduit 2 and removed through conduit 3.

The glycol is heated in vessel 1 by contact with firetube portion 4. All glycol and water vapors evolved ascend in still column 5. A cooling (reflux) coil 6 is mounted in the upper portion of still column 5 to condense glycol and water vapors so the condensate will flow down the column as a reflux medium, water continually discharging from the top of the still column as a vapor.

The reboiler is, of course, part of a larger system. The glycol is employed to directly contact gas to be dehydrated. Rich with water absorbed from the gas it contacts, the glycol is inserted into vessel 1 to have the absorbed water extracted in the process within the vessel. Obviously there is much of the associated equipment of the system not shown in the drawing in order to serve the purposes of simplicity.

In the disclosure, more than one source of heat is shown for raising the temperature of the rich glycol prior to its insertion in still column 5. The rich glycol, in passing through reflux coil 6, picks up a measure of heat. Heat exchanger 7 provides an additional means by which the glycol may be heated. The products of combustion in stack 8, as an original source of heat, pass over heat exchanger 7 to provide this heat. The rich glycol, preheated in at least coils 6 and 7, is released in still column 5. Depending upon the temperature to which the rich glycol has been preheated, a certain amount of water and glycol is flashed into vapors which will flow up the column while the remaining mixture of liquid glycol and water flows down the column.

The rich glycol received into reboiler vessel 1 is heated by firetube portion 4 while gas, undersaturated with respect to water vapor, is introduced into the bottom of vessel 1 by means of conduit 9. The additional heat in reboiler 1, together with the shift in vapor equilibrium with respect to water vapor, with the gas of conduit 9, completes the separation of glycol and water vapor, leaving the dry, or lean, glycol to be drawn off through conduit 3.

DESICCANT CIRCUIT

This disclosure has uniformally assumed the function of a still column on a glycol reboiler to be well-known. Both glycol and water vapors are generated by heat applied to the rich stream to be reconcentrated. The heated rich stream is inserted into the still column, heat having been applied to the stream prior to insertion into the column and after the liquid from the stream flows down the column into the reboiler. It is the application of the heat before the stream is inserted into the column, during the flow of the stream in the column and after the liquids of the stream have flowed from the column that is under primary consideration in this disclosure. In supplying the required heat at various stations along the flow path of the stream, conservation of the heat is obtained while preparing the liquid for final contact with a gas undersaturated with respect to water vapor.

Heat must be withdrawn from the top of still column 5 to produce the required reflux. Coil 6 is mounted in the upper portion of the column to bring the rich glycol into indirect heat exchange with the glycol and water vapors flowing up the column. By this well-known arrangement, the rich glycol is given a measure of heating while producting the required reflux. Conduit 12 connects the outlet of coil 6 to the inlet of heat exchange coil 7.

The rich glycol of conduit 12 is to be heated in exchanger 7, however, the mixture of glycol and water collected on liquid draw-off tray 13 in the upper portion of column 5 is conveyed to the rich glycol of conduit 12. Tray 13 is given sufficient physical elevation that the liquid collected thereon will gravitate downward through conduit 14 and join the rich glycol of conduit 12. All of this liquid is then elevated in temperature within exchanger 7, this being a reheating for the liquids from tray 13.

The mixture of glycol and water heated in exchanger 7, by an original source of heat, is flowed through conduit 15 to a point of release in column 5 just below tray 13. This mixture of glycol and water is hot enough by the time it is released at 17 to flash a predetermined amount of the water into vapor. The remaining glycol and water liquids flow down column 5 to join the liquid body 18 which is being heated in vessel 1. During the heating within vessel 1, gas which is undersaturated with respect to water vapor is introduced into a distributor in the lower portion of vessel 1 from conduit 9. Following this final step of reconcentration in vessel 1, the glycol flows out the conduit 3 for reuse and eventual re-entry through conduit 2.

In one sense, the desiccant circuit is heated at any available source of heat. It is conventional to pick up some degree of heat in reflux coil 6. It is also well understood in the art how the hot, reconcentrated desiccant of conduit 3 can supply additional heat to the desiccant circuit. For this purpose, it is conventional to supply a storage, or surge, tank in which a heat exchange coil is arranged for indirect contact between the reconcentrated glycol and the rich glycol out of coil 6. This brings the consideration down to adding heat from a directly fired original source.

A separately fired vessel could be utilized, as an original source of heat, to bring the temperature of the rich glycol in exchanger 7 up to a desired level. In FIG. 1 it is shown how advantage can be taken of the fact that exchange coil 7 can be mounted in the exhaust stack of the firetube inserted in vessel 1.

SELECTIVE HEAT APPLICATION

In the disclosure, firetube portion 4 appears to be representative of the well-known configuration of a firetube used in many heated vessels throughout the oil fields. Burner 19, as mounted in a firetube portion 4, is conventional in structure and supplied fuel in a conventional manner. Further, the fuel is controlled in a conventional manner. This burner 19 delivers its products of combustion down a first leg of tube 4 and they are exhausted from the second leg. The cooled products of combustion are discharged to the atmosphere from stack 8. However, in the present disclosure, it is to be noted that firetube portion 4 is by-passed by section 20.

Section 20 is arranged to form a flow path for original products of combustion from burner 19 which by-passes portion 4. A diverting structure is embodied in damper 21, and setting this damper structure determines which portion of the products of combustion from burner 19 goes through firetube portion 4 and which portion of the products of combustion goes through firetube by-pass portion 20. Whether this damper structure is mounted at the specific location indicated, and whether the diverting structure takes the simple form of the damper illustrated, it is an object of the present invention to provide this "split" of the original heat output of burner 19 between liquid body 18 and the rich glycol flowing through exchanger 7 which is mounted in stack 8. With this arrangement, the basic heating demand of the rich glycol being reconcentrated is divided across the still column 5.

CONTROL OF SELECTIVE HEAT APPLICATION

As previously indicated, the heat load addition to the system is split across the still column 5. Superficially it would appear that this can be done more desirably by two separate firing systems. However, if a single burner and splitting conduit system can be arranged efficiently, practically all of the useful, original heat released by the one burner can be utilized in this reconcentration process.

Burner 19 is indicated as mounted in a conventional manner to direct its flame down one leg of firetube portion and/or up through by-pass 20. A pilot is indicated, along with a flame arrestor across the air intake for the burner as conventional accessories.

The fuel is supplied through conduit 25 and regulated by valve 26. Valve 26, in turn, is positioned by the output of a relay 27 which receives the input from temperature sensing primary element 28. Temperature controls of this nature are conventional and well-known and no further explanation of their function is required. It is enough to disclose that element 28 responds to the temperature of the glycol and water mixture as it flows from being heated in exchanger 7. The basic heat output of burner 19 is determined by the demand for heat by this mixture. When this temperature is attained, the mixture released at point 17 will have the desired amount of water vapor flashed into vapor.

The heat from burner 19, as pointed out, is directed by structure of which damper 21 is representative. An actual embodiment may take any number of specific forms; the present arrangement disclosed is adequate to indicate that a diaphragm operator 29 is linked to damper 21 for powering the damper to its various required positions. As with valve 26, operator receives its signal from a relay 30 which, in turn, responds to a signal from temperature element 31.

As element 31 is placed in the glycol and water mixture of vessel 1, the damper 21 directs the heat required to satisfy this temperature. At the same time, the basic firing rate of burner 19 is set to elevate the output temperature of the exchanger output. The two controls coordinate smoothly, through the link of the thermal patterns of the process. Once the desired temperature at 31 is reached, damper 21 moves to block off tube portion 4 from the products of combustion of burner 19. The burner 19 continues to generate heat at a rate which will raise the temperature at 28 to the desired value. The complete cycle of heating goes forward smoothly and automatically.

One of the results of dividing up the heat load of the reconcentrator across the still column is a reduction in the amount of undersaturated gas required to shift the vapor equilibrium with respect to water vapor above the liquid body 18. The more concentrated the glycol before it reaches vessel 1, the less of this is gas required to gain a concentration in the neighborhood of 99.6%.

Therefore, heating the rich glycol under the superatmospheric pressure within exchanger 7 causes the rich glycol to give up a large portion of its water when the pressure is reduced in still column 5. Further heating of the rich glycol in vessel 1 continues the evolvement of water vapor. Finally, regeneration gas is introduced in the bottom of vessel 1 and the last of the water to be extracted is evolved. This combination of process steps produces a glycol with a very low amount of water remaining in solution.

FIG. 2

The heat required to maintain the reboiler liquids at their desired temperature, for completing the removal of water, may be significantly less than that required to elevate the rich glycol to the temperature desired upon entry of the liquids into the still column. Therefore, the general design could include a direct, primary firing of the heat exchanger preheating the rich glycol with the exhaust products of combustion providing a secondary heating of the reboiler. FIG. 2 illustrates how this concept may be embodied in combination with the concept of dividing the heating duty across the still column.

In a FIG. 2, a heated vessel 50 is provided to receive the rich glycol to be reconcentrated. This preheater may receive the rich glycol after it is used for reflux cooling in the still column and after absorbing heat from the reconcentrated glycol out of the reboiler. Similar heating steps have been described in connection with FIG. 1. The arrangement given particular attention here includes preheater vessel 50 with firetube 51 mounted to heat its rich glycol and exhaust its products of combustion through stack-conduit 52.

Branch conduit-stack 53 is provided as a path through which to shuttle a portion of the exhaust of stack-conduit 52 to a heat exchange section 54 which is mounted in reboiler vessel 55. The products of combustion are then discharged to atmosphere through stack 56.

The burner 57 of firetube 51 is controlled by the temperature of the liquids in preheater 50. The elevated temperature desired for these liquids as they flow into the still column is thereby assured.

The final temperature desired for reboiling in vessel 55 is controlled by a temperature element mounted in the liquids of the reboiler. This temperature element is linked to a diverting mechanism at the junction of stack-conduit 52 and conduit-stack 53. Products of combustion are diverted, as required, through exchanger 54 to give the final thermal polish to the reboiler liquids as the product of the process.

CONCLUSION

The basic features of the structures disclosed in FIG. 1 and FIG. 2 are the same. A reboiler vessel is the center of each system. The rich glycol brought to the systems for reconcentration ends up in the reboiler, flowing from the vessel as the lean, or reconcentrated, glycol product.

In each system, the rich glycol is brought to a temperature, upon entry into the still column, which will cause a large percentage of the water absorbed by the glycol to flash into vapor. A large amount of glycol will also vaporize, so a positive reflux liquid comprising mostly water is needed to prevent the escape of the glycol from the top of the still column. A tray to collect this reflux liquid from which it can be cycled back to the preheater entry, is illustrated in both drawings.

In each system, the load upon the system supplying vapor undersaturated with respect to water vapor, is lessened by shifting a portion of the heating up-stream of the reboiler. The result is a glycol of high purity, ready to dehydrate gas.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of reconcentrating rich liquid desiccant by removing absorbed water, including,
   first heating said rich liquid desiccant with heat generated by an original source under super-atmospheric pressure to a temperature at which a substantial portion of the absorbed water will evolve as vapor when the pressure on the mixture is subsequently reduced,
   reducing the pressure on the heated rich desiccant to evolve a substantial portion of the absorbed water as vapor,
   second heating said rich desiccant after the pressure reduction to evolve an additional portion of the absorbed water as vapor,
   and introducing a vapor undersaturated with respect to water vapor into the rich desiccant during the second heating after the pressure is reduced,
   whereby the vapor equilibrium with respect to water vapor above the rich desiccant is shifted to evolve additional water vapor.

2. The method of claim 1 in which,
   the first heating is controlled by regulating the medium conveying heat from the original source into exchange with the rich desiccant.

3. The method of claim 1 in which,
   the second heating in controlled by regulating the medium conveying heat into exchange with the rich desiccant.

4. The method of claim 1 in which,
   the quantity and division of heat from a single original source between the first and second heating of the rich desiccant is controlled in response to the temperature of the rich desiccant after the first heating and the temperature of the rich desiccant during the second heating.

5. Apparatus for reconcentrating rich liquid desiccant by removing absorbed water, including,
   a heat exchanger connected to receive said desiccant and supplied regulated heat generated by a single original source for raising the temperature of said rich liquid desiccant under super-atmospheric pressure until a substantial portion of the absorbed water will evolve as vapor when the pressure is reduced,
   a still column connected to the heat exchanger to receive the heated rich liquid desiccant at the reduced pressure at which a substantial portion of the absorbed water will evolve as vapor,
   a vessel connected to the still column for receiving said rich liquid desiccant from the still column and supplied regulated heat for again raising the temperature of the rich liquid desiccant received from the still column,
   and a supply of vapor which is undersaturated with respect to water vapor connected to the vessel for shifting the vapor equilibrium with respect to water vapor above the rich liquid desiccant during the second heating to evolve additional absorber water as vapor.

6. The apparatus of claim 5 in which said single original source of heat has an output divided to provide regulated heat to the exchanger and regulated heat to the vessel.

7. The apparatus of claim 6 in which the total output of the single original source of heat is controlled by the temperature of the rich desiccant flowing from the exchanger under super-atmospheric pressure.

8. The apparatus of claim 6 in which the division of the output from the single original heat source is controlled by the temperature of the rich desiccant heated in the vessel.

9. An apparatus for reconcentrating rich liquid desiccant including,
   a reboiler vessel in which a rich liquid desiccant is heated,
   a still column mounted on the upper portion of the vessel to receive vapor evolved from the rich desiccant heated in the vessel,
   a reflux coil mounted in the upper portion of the still column to cool the vapors passed up the column until liquid desiccant vapors are condensed,
   an indirect heat exchange coil subject to the output of an original heat source and arranged to receive the rich desiccant and raise its temperature under superatmospheric pressure, a conduit system conducting the rich desiccant through the reflux coil and the heat exchange coil and to the still column where the heated rich desiccant is released from the pressure to substantially atmospheric pressure to evolve a substantial portion of the absorbed water as vapor, said original heat source arranged to have its heat output divided between the reboiler vessel and the heat exchange coil under the control of the temperature of the rich liquid desiccant in the reboiler vessel, and mean for introducing a vapor undersaturated with respect to water vapor into the rich liquid desiccant of the reboiler vessel to evolve additional absorbed water as vapor.

10. The apparatus of claim 9 in which, the output of the heat source to the reboiler and heat exchange coil is under the control of the temperature of the rich liquid desiccant flowing from the heat exchange coil to the still column.

References Cited

UNITED STATES PATENTS

| | | | |
|---|---|---|---|
| 3,105,748 | 10/1963 | Stahl | 55—32 |
| 3,233,390 | 2/1966 | Meyers | 55—196 |
| 3,348,601 | 10/1967 | Hill | 55—32 |
| 3,370,636 | 2/1968 | Francis et al. | 159—31 X |

NORMAN YUDKOFF, *Primary Examiner.*

J. SOFER, *Assistant Examiner.*

U.S. Cl. X.R.

55—32; 159—31, 44, 47